April 23, 1940. W. H. MARSHALL, JR 2,198,560
METHOD FOR THE PRODUCTION OF HYDROGEN
Filed April 18, 1938
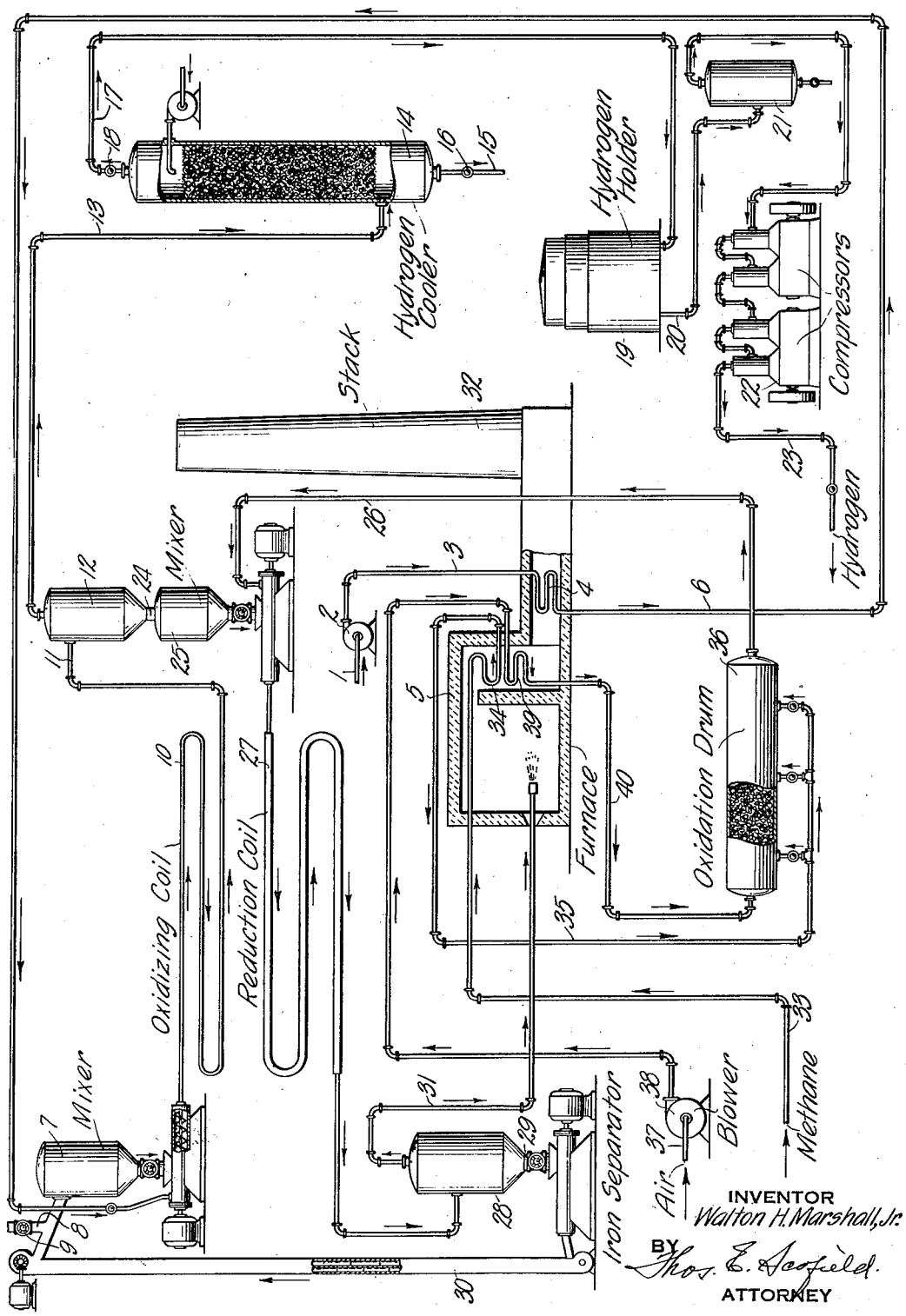
INVENTOR
Walton H. Marshall, Jr.
BY
Thos. E. Ashfield
ATTORNEY

UNITED STATES PATENT OFFICE 2,198,560

METHOD FOR THE PRODUCTION OF HYDROGEN

Walton H. Marshall, Jr., Nutley, N. J., assignor to The M. W. Kellogg Company, New York, N. Y., a corporation of Delaware Application April 18, 1938, Serial No. 202,608

2 Claims. (Cl. 23—214)

This invention relates to improvements in a method of producing hydrogen and refers more particularly to a method for contacting steam and iron which have been mixed to form a suspension, the steam serving as a carrier for the iron particles. The process contemplates treatment of this suspension or mixture of steam and iron at temperatures sufficiently high to decompose the steam due to the reducing effect of the iron particles. Following the oxidation stage is a separating stage wherein the ferrite, or oxidized iron particles are removed from the suspension and recharged with a reducing gas in the form of a second suspension to reduce the iron oxide to metallic iron in a reduction zone. Following the reduction of the iron, the metallic material is recirculated to the oxidation stage and the spent reducing gases utilized as fuel to heat the gaseous material supplied to the reduction zone as well as the steam introduced to the oxidizing stage.

It is recognized that the chemical reactions involved in the process are well known, but the method of contacting the metallic iron and iron oxide with the gases in the separate stages is considered novel in the art.

The accompanying drawing, which forms a part of the specification, and which is to be read in conjunction therewith, is a diagrammatic view of one form of apparatus capable of carrying out the process of my invention.

More particularly now referring to the drawing, and describing the process in connection with the apparatus shown, steam is supplied to the oxidation stage by pumping water from any convenient source furnished through pipe 1, pump 2, and pipe 3 to a heating coil 4 located in the flue of a furnace 5. Part of this steam passes from a heating coil through the pipe 6 and is introduced to a mixing device such as that shown in United States Patents 1,553,539 and 2,102,330. Such devices are furnished by the Fuller Kinyon Co. for the mixing of pulverized material with air or gases of any kind. This same company furnishes a similar device known as the Airveyor which operates on the principle of an injector, the air being supplied to the device in considerably greater quantities than are used in the devices shown in the patents, and this air combines with the solid particles by drawing them from a source of supply such as a hopper, instead of having the solid particles fed to the carrier gas by means of a conveyor screw as shown in the patents. Either device is applicable for the purpose of mixing solid particles with the steam and the details of the mixing device form no part of the present invention.

Metallic iron is introduced to the mixer 7 through a pipe 8 controlled by valve 9. The steam and iron particles are agitated to form a suspension which has fluid characteristics and can be pumped or forced through receptacles or pipes in a similar manner to liquid material. This suspension maintained at a temperature sufficiently high to decompose the steam in the presence of iron is circulated through an oxidizing coil 10, which is provided with means for extracting exothermic heat of reaction produced during oxidation of the steam. Provision may be made for extracting this heat by jacketing the coil and circulating cooling medium through the jacketed portion, or extended surface may be put around the coil and air circulated over the extended surface to remove the heat. The suspension of gaseous material and solid iron particles is discharged from the oxidation coil 10 through pipe 11 to an oxide separator 12, which may take the form of a cyclone dust separator effective to remove solid particles from gaseous material. The gas passes off from the top of the separator through pipe 13 and is introduced into the bottom of a tower 14, which is packed with coke or ceramic material and in which the steam is condensed and the hydrogen cooled by direct contact with water. The condensed liquids flow through line 15 controlled by valve 16 and the purified gas is discharged from the top of the tower through pipe 17 controlled by valve 18. Pipe 17 is connected to a hydrogen holder 19 or other suitable storage means. From the hydrogen holder a gas may be removed through pipe 20 and passed through what is known as a knock-out drum 21, or separator such as is usually positioned on the suction side of compressors to remove entrained liquids or solids. By means of compressors 22, the gas may be charged to storage or to other apparatus where it is to be used through the pipe 23. Returning to the solid material accumulated as ferrite ($Fe_3O_4$) in the oxide separator 12, this material is discharged through pipe 24 into a second mixing device 25, similar to that shown at 7, to which is also introduced a reducing gas through the pipe 26. Again the solid particles are mixed with the gas to form a suspension which is forced by the pressure of the gas through a reduction coil 27 wherein temperatures are maintained which reduce the ferrite to metallic iron. Normally, such temperatures range from 1000 to 2000 degrees F., 1500 to 1600 degrees F. being normal temperatures for this reduction zone. The suspension discharged from the reduction coil 27 is again separated in a cyclone separator designated as an iron separator and by the numeral 28. Again the solid particles reduced in the reduction zone to metallic iron are accumulated in the bottom of a separator to be drawn off through pipe 29 and recycled through pipe 30 to the mixer 7. The gas separated from metallic iron in the iron separator 28 passes overhead through pipe 31 and is burned in the furnace 5 where the heat of the combustion gases is utilized to generate steam in the coil 4 before it is discharged as flue gas through the stack 32. Methane, or other fractions of hydrocarbon gas containing carbon and hydrogen, is supplied to the system through pipe 33, and is circulated through a heating coil 34 positioned in the furnace setting 5. This hydrocarbon gas, after being heated, passes out through line 35 and it is introduced into an oxidation drum 36 to which is also supplied an oxidizing gas in the form of air or oxygen introduced from any convenient source of supply through pipe 37 and blower or compressor 38 to be heated in coil 39 also located in the furnace setting 5. The heated oxidizing gas discharged from coil 39 is directed through pipe 40 and is combined with the hydrocarbon gas in the oxidation drum 36. This oxidation drum may be filled with checkerboard brick or crushed ceramic material, and is preferably supplied with a catalyst such as nickel, which accelerates the reaction between the gases to produce a reducing gas containing carbon monoxide and hydrogen and other diluents, such as nitrogen and carbon dioxide. The reducing gas is discharged from the oxidation drum through pipe 26 by means of which it is circulated back into the mixing device which produces the suspension with the ferrite or iron oxide accumulated in the oxide separator.

Typical temperatures maintained in the apparatus to obtain results desired are as follows:

Metallic iron supplied in particle size ranging from particles which will pass a mesh having 20 holes to the inch up to particles which will pass a mesh having 200 holes to the inch are introduced with the steam in mixer 7, the iron being at a temperature of 1200 degrees F., and the steam at a temperature of from 212 to 800 degrees F. Operating temperatures in the oxidation stage are somewhat above 600 degrees F.

Temperaure of the gas discharged from the oxide separator may range from 500 to 1000 degrees F. and temperatures of the solid ferrite discharged into the mixer 25 may range from 500 to 1000 degrees F.

Reducing gas is preferably introduced into the mixer 25 at a temperature in excess of 1000 degrees F. and may range to temperatures as high as 1800 to 2000 degrees F.

In the reducing zone an endothermic reaction proceeds and temperatures of the suspension to be introduced into the iron separator are somewhat lower than it is at the inlet. Normally the temperatures of the suspension on arriving at the iron separator range from 1000 to 1500 degrees F.

Methane supplied to the line 33 is heated to temperatures of the order of 800 degrees F. before introduction into the oxidation drum.

The oxidizing gas such as air or oxygen, or mixtures thereof, supplied through line 37, is heated to temperatures in excess of 500 degrees F. in the coil 39 before being combined with the heated hydrocarbon gas supplied through the line 35.

In the oxidation drum an exothermic reaction takes place producing an increase in temperature. The extent of this increase can be regulated by the temperatures of preheating the respective gases and the relative quantities of the gases supplied to the oxidation drum.

As a typical operation of the process, 400 lbs. of steam containing 50 degrees F. of superheat is supplied to the system through the pipe 6 at the rate of 29,150 lbs. per hour to the mixer 7. With iron supplied at 1200 degrees F. at a rate of 55,100 lbs. per hour to the mixer 7 a cooling duty of 7,965,000 B. t. u.'s per hour is required in the oxidation coil, giving an outlet temperature of the gas passing through line 13 and the solid discharged to the mixer 25 of 800 degrees F. The gases contain 2,632 lbs. per hour of hydrogen and 5,450 lbs. per hour of steam, which is recovered as condensate. 76,168 lbs. per hour of ferrite are charged to the mixer 25 with 41,150,000 cu. ft. of reducing gas containing various percentages of carbon monoxide, hydrogen, nitrogen and steam. A like amount of gas is discharged into the iron separator with the solid particles of metallic iron in suspension.

The apparatus shown and described is indicated in very diagrammatic form, and it will be understood that changes may be made in its detail without departing from the spirit or scope of the invention.

It will be further understood that certain features and sub-combinations are of utility and may be employed without reference to other features and sub-combinations. This is contemplated and is within the scope of the plan.

It is further obvious that various changes may be made in detail within the scope of the claim without departing from the spirit of the invention.

It is, therefore, to be understood that the invention is not to be limited to the specific details shown and described.

Having thus described my invention, what I claim is—

1. A method of producing hydrogen, including the steps of suspending a finely divided metal capable of reducing water at elevated temperatures in steam as a carrier medium, flowing the finely divided metal and steam in an elongated, confined stream and subjecting the mixture to temperatures at which the steam will be reduced to form hydrogen and a metal oxide, separating the metal oxide from the reaction products, recovering hydrogen from the reaction products, simultaneously with the above steps partially oxidizing a hydrocarbon gas to form a reducing gas mixture containing carbon monoxide and hydrogen, suspending the metal oxide previously separated in the process in said reducing gas mixture and flowing the suspended metal oxide and reducing gas mixture in an elongated confined stream, while subjecting it to a temperature between 1000° F. and 2000° F. to reduce the metal oxide, separating the reduced metallic oxide from the reaction products and returning the reduced metallic oxide to the steam suspending zone for recycling.

2. A method of producing hydrogen including the steps of suspending a finely divided metal capable of reducing water at elevated temperatures in steam, subjecting the suspension to an elevated temperature at which said steam will be reduced to form hydrogen and a metal oxide, separating the reaction products into hydrogen and a metal oxide, continuously withdrawing hydrogen from said separating zone, continuously withdrawing finely divided metal oxide from said separating zone, suspending said metal oxide in a reducing gas and flowing said suspension in an elongated, confined stream at temperatures between 1000° F. and 2000° F. to reduce said metal oxide, and recycling said reduced metal oxide to said steam suspending zone for recycling.

WALTON H. MARSHALL, Jr.